Patented Dec. 18, 1928.

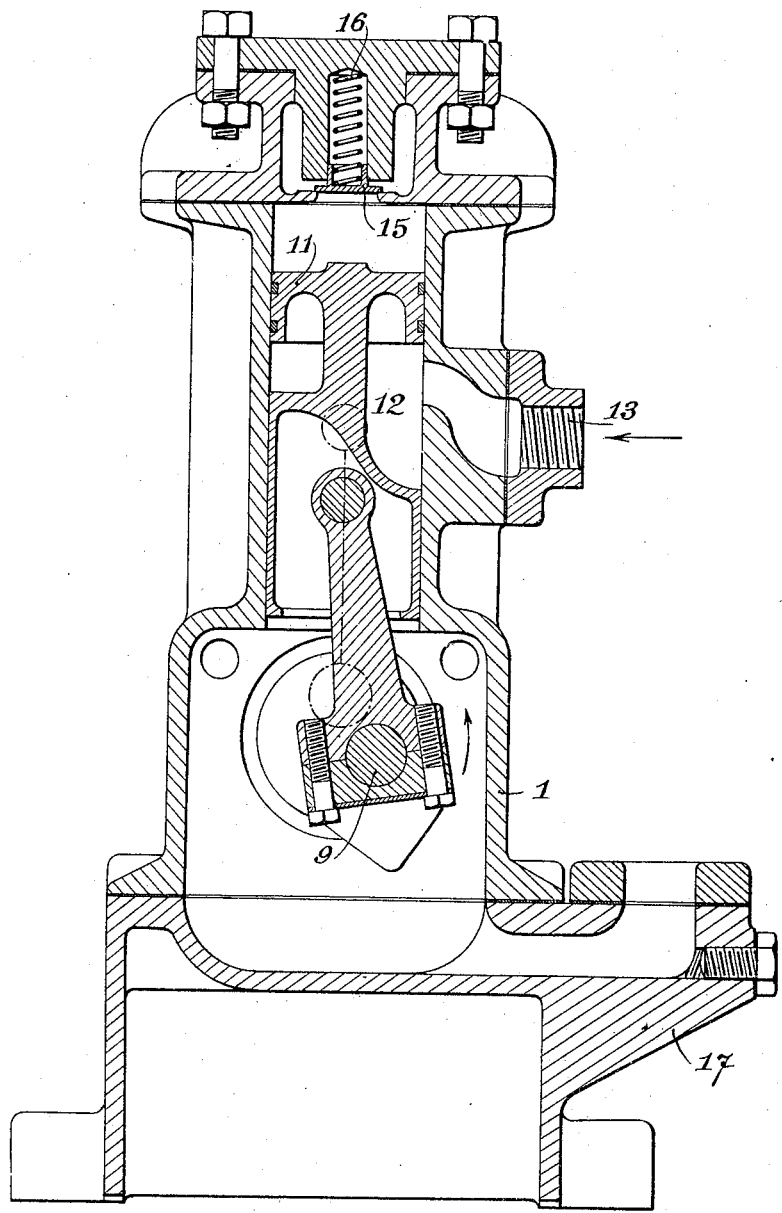

1,695,401

UNITED STATES PATENT OFFICE.

PAUL VOREAUX, OF PARIS, FRANCE, ASSIGNOR OF ONE-HALF TO SOCIÉTÉ "ETABLISSEMENTS SAMGA & BAVOX RÉUNIS," OF PARIS, FRANCE.

AIR PUMP.

Application filed March 17, 1927, Serial No. 176,186, and in France November 6, 1926.

The present invention has for its object an air pump or compressor of simple construction and high volumetric efficiency at all pressures, which will operate at high speeds and will provide for great pressures or vacuums.

The said pump comprises two cylinders placed side by side in the parallel position, each cylinder containing a piston actuated by a common crank-shaft. One cylinder contains a piston which is employed for suction and for preliminary compression, and the second cylinder contains a piston which is so disposed as to serve as a piston for high compression as well as a cylindrical slide valve controlling the suction and delivery of the first piston through a port offering communication between the two cylinders.

The appended drawing shows by way of example a form of construction of the apparatus according to the invention.

Fig. 2 is a cross-section on the line 2—2 of Fig. 1.

Figure 1:
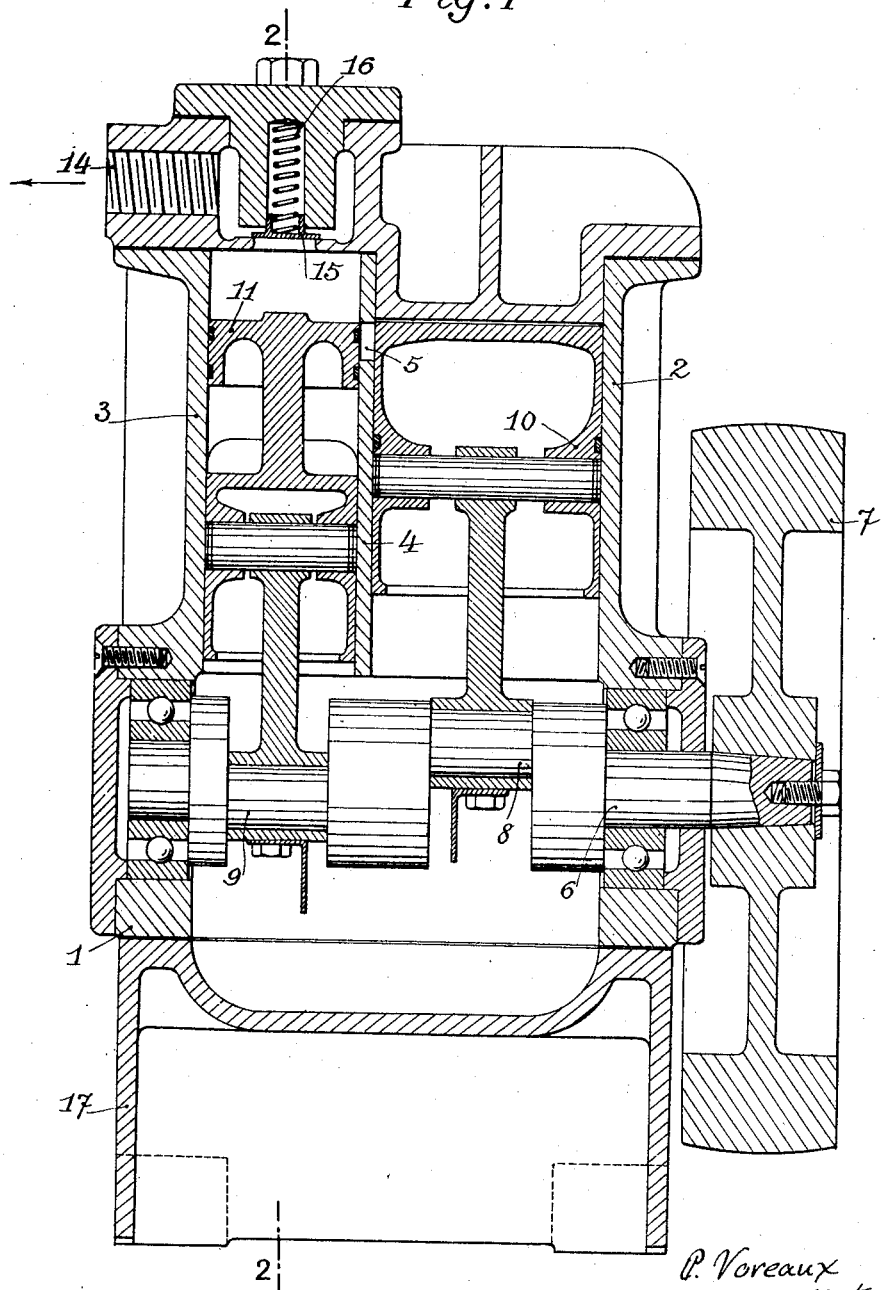
Fig. 1 is a lengthwise section of the pump.

The pump comprises a main body 1 which may be cast in one with the two cylinders 2 and 3, which are separated from one another by a common wall 4, pierced with the port 5 for connecting the two cylinders.

In the said pump body is rotatable the crankshaft 6 which is mounted in ball-bearings and is driven by a combined pulley and flywheel 7; it comprises two cranks 8—9 with the proper angular spacing; the crank 8 is set forward by about 115 degrees relatively to the crank 9.

Upon the crank 8 is mounted the rod of a piston 10 coacting with the cylinder 2. Upon the crank 9 is mounted the rod of a piston 11 coacting with the cylinder 3 and so disposed as to form a piston for high compression as well as a cylindrical slide valve, due to the recess 12 provided in its upper part.

The air suction takes place at 13 (Fig. 2) on the cylinder 3, and the delivery is effected through the conduit 14 controlled by a valve which is provided on the upper end of the cylinder 3 and is subjected to the action of a spring 16.

The pump thus constituted is mounted on the base or frame 17 which also forms the bottom of the main body 1.

The operation of the said pump is as follows:

In the position of the parts which is herein represented, the piston 10 is at the upper dead centre; the piston 11, which is still rising, has already closed the port 5 and further compresses the air which has been withdrawn and has been compressed in the cylinder 2. I may determine in advance the capacity formed above the piston 11 in the position which it occupies in Fig. 1, so as to obtain the proper degree of compression in the cylinder 2; this capacity may even attain the capacity formed by the piston 10, which latter will now serve only as a displacing element, this arrangement being justified in the case of pumps for high vacuum, or the like.

When the piston 11 is at its upper dead centre, the slide valve has already opened the port 5, and the piston 10 which again descends will withdraw the air which it is to compress when on the upward stroke, and the same series of operations continues.

Due to the almost complete suppression of the waste spaces, and also due to the small pressure upon the piston 10 and to the great facility of which the apparatus can be made fluid-tight, the said pump may be constructed with a very small stroke, and this simplifies the construction of the crankshaft 6 and the piston rods. For the same reasons, the construction of pumps having a very small cylinder capacity and a high speed is simplified from the fact that the pump is not limited to small bores, which are difficult to obtain. I further dispose of a considerable space for mounting the discharge valve 15, and readily obtain large flow sections for air or compressed gas.

The pump has a great volumetric efficiency at all pressures, and it affords high pressures or high vacuums.

The time required for the compression and the delivery is longer than in a single-cylinder pump, thus providing for rapid functioning, aided by the fact that the cooling is increased by the large surface of the walls.

Furthermore, a defective functioning, such as a delay in the closing of the valve or a lack of tightness in the valve, will not prevent the operation of the pump and will cause only a slight reduction in the efficiency.

For these reasons, the pump will be chiefly valuable for all the industries employing air or other compressed gaseous fluid, for instance for air spraying, cleaning, engraving upon glass, or for like purposes.

The particular shape of the piston 11 shown in Figs. 1 and 2 is characterized by the use of a deep groove which is formed entirely around the said piston and extends to a lower point on the side next the suction conduit 13 than on the other side. This groove divides the piston into an upper and a lower part which latter is longer than the other. Considering the direction of rotation as shown by the arrow in Fig. 1, the longer side of the piston is the one that is pressed against the wall of the cylinder during the compresion stroke.

The conduit 13 opens into the cylinder 3 at a point which is situated in the diametrical plane perpendicular to the axes of the two cylinders; this construction allows of placing the partition of the piston obliquely above the axis of pivotation of the piston 11 upon its rod, while maintaining a length for this axis which is equal to the diameter of the cylinder, as shown in Fig. 1, so that the height of the compressor may be a minimum with reference to the piston stroke and to the necessary height of the ports 5 and 13.

Having thus described my apparatus, what I claim as new therein, and my own invention, is:

In an air pump, the combination of a low pressure cylinder, a high pressure cylinder arranged in parallelism with the said low pressure cylinder and juxtaposed to the latter, a piston of a large diameter in the said low pressure cylinder, a piston of small diameter in the said high-pressure cylinder, a crankshaft adapted to operate the said pistons, the cranks of the said shaft being angularly displaced the one relatively to the other, and links connecting the said pistons to the respective cranks, the said high pressure cylinder having in its wall, in the plane of oscillation of the respective link, a suction port opening to the exterior, and in the plane of the cylinder axes, a port opening into the top of the low pressure cylinder, and the said high pressure piston being provided in its cylindrical face with a very deep circular groove whose wall at the side of the upper end of the respective link is inclined in a direction parallel to the plane of rotation of this link, the lower part of this wall being situated on the suction port side and extending about to the level of the axis of articulation of the said high pressure piston with the respective link.

In testimony whereof I have hereunto affixed my signature.

PAUL VOREAUX.